United States Patent [19]

Bourbon

[11] 4,237,637
[45] Dec. 9, 1980

[54] INFORMATION DISPLAY PANEL

[76] Inventor: Jean Bourbon, B.P. 1, Saint-Lupicin, France, 39170

[21] Appl. No.: 10,533

[22] Filed: Feb. 8, 1979

[30] Foreign Application Priority Data

Feb. 8, 1978 [FR] France .............................. 78 04178

[51] Int. Cl.³ .............................................. G09F 7/02
[52] U.S. Cl. ...................................................... 40/618
[58] Field of Search ................. 40/584, 618, 620, 107, 40/110

[56] References Cited

U.S. PATENT DOCUMENTS

| 355,132 | 12/1886 | Brown et al. | 40/618 |
| 994,734 | 6/1911 | Fitch | 40/618 |
| 1,315,077 | 9/1919 | Barclay | 40/618 |
| 1,985,227 | 12/1934 | Bland | 40/620 |
| 2,745,201 | 5/1956 | Guoseppe et al. | 40/618 |
| 4,015,351 | 4/1977 | Sasson | 40/110 |
| 4,028,828 | 6/1977 | Chao et al. | 40/620 |

FOREIGN PATENT DOCUMENTS 1184363 7/1959 France ...................................... 40/110

Primary Examiner—Gene Mancene
Assistant Examiner—Wenceslao J. Contreras
Attorney, Agent, or Firm—Lewis H. Eslinger

[57] ABSTRACT

Presentation and display panel for miscellaneous informations of the type comprising a plate covered by a matrix carrying information disposed parallel to slots made in the matrix and serving for the passage of gripping members carried by identification elements displaceable between the plate and the matrix, wherein the panel has on its face covered by the matrix a given aspect or appearance, the matrix is transparent and has at least one partly flexible segment separated from matrix by at least one slot and held on the matrix by an attachment support, the matrix carries on flexible segment information with the same appearance as the face of the panel and the identification elements have a contrasting appearance compared with that of the face and the information.

Display panels for displaying the results of games, forecasts and competitions, also usable as a didactic or calendar panel.

5 Claims, 6 Drawing Figures

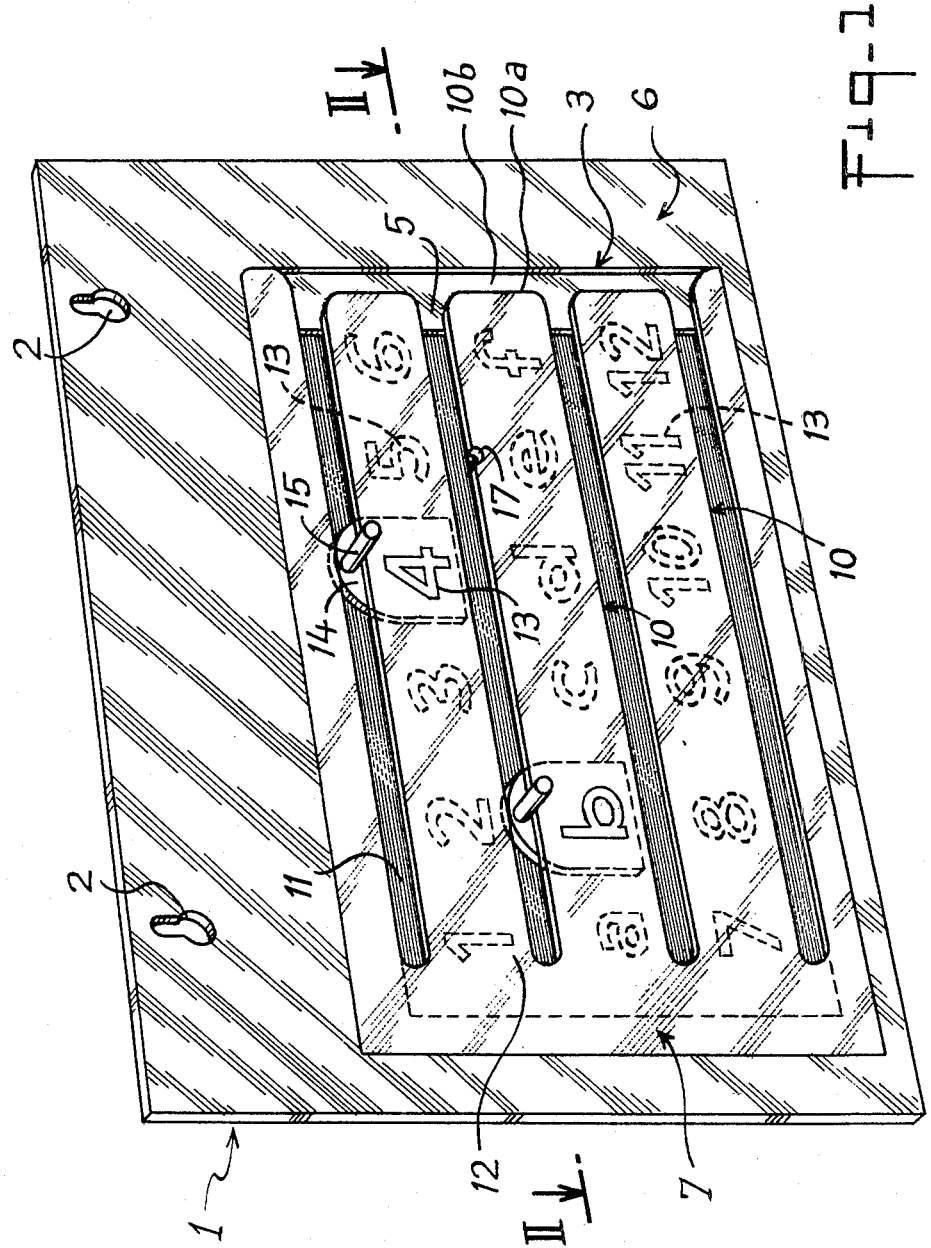

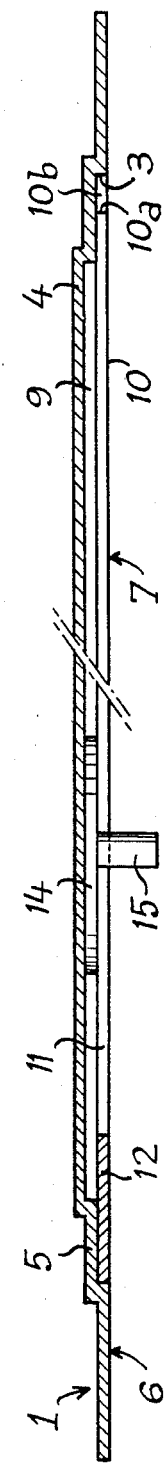
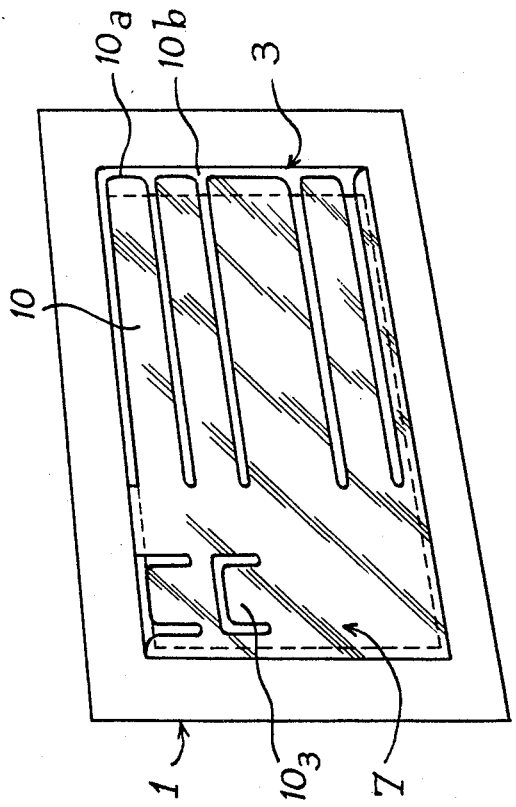
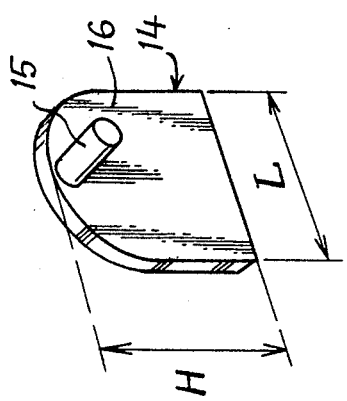

INFORMATION DISPLAY PANEL

BACKGROUND OF THE INVENTION

The present invention relates to panels used for displaying to the public various types of information of a momentary or temporary nature which has to be rapidly visually appraised with no risk of change or error of interpretation.

In many fields display panels are used to display symbols or information which must be read without any danger of misinterpretation. This is the case of display panels in general which supply the results of games, forecasts and information of a utalitarian, industrial or didactic nature. Hitherto, the panels used have generally visualized and selected the sought information from a collection permanently carried by such a panel. Selection and visualization take place by means of removable identification means such as disks, rings or similar elements fixed, connected, mounted or associated in some other way with one or more informations so as to make them stand out and facilitate their visual distinction compared with the general collection carried by the panel.

In general, such means only prove to be moderately satisfactory because they do not make it possible to select in a rapid and practical manner information having to be retained and moreover they do not identify such information in a sufficiently clear and precise manner to make it stand out compared with the other information carried on the panel.

To obviate this disadvantage, information carrying panels are used on which the information is selectively visualized by independent illumination or lighting controlled by a control board. Such means certainly make it possible to solve the problem of identifying the symbols retained but, in view of their high price, they cannot be used for all possible applications of display panels.

BRIEF SUMMARY OF THE INVENTION

The present invention aims at obviating this disadvantage by proposing a novel, simple and practical display and presentation panel able to show selected information in a clear and precise manner with no risk of any misinterpretation on the part of the public which is to be informed.

The object of the invention has the supplementary advantage of having an uncomplicated construction making its use possible in a large number of applications, even in the case where the information from which the selection has to be made is relatively large.

Another advantage of the object of the invention is that of permitting the rapid visualization and easy identification change of the information carried so as to facilitate the changing, replacing or modification of those items of information having to be selected as a function of the identification criteria used.

The invention therefore relates to a panel for the presentation and display of miscellaneous information, wherein it comprises on the one hand a panel having on its front face a given aspect or appearance and on the other at least one adaptable transparent matrix on the panel and defining at least one flexible segment carrying information having the same aspect as the front face of the panel and, in addition, identification elements which can be moved between the front face and at least the flexible segment and having in the direction of the latter a surface having a contrasted appearance compared with that of the front face and the information.

BRIEF DESCRIPTION OF THE DRAWINGS

The invention will be described in greater detail hereinafter relative to non-limitative embodiments and with reference to the attached drawings, wherein show:

Fig. 1 is partly torn away perspective view of the object of the invention

FIg. 2 a section along the line II—II of FIg. 1.

FIG. 3 a perspective view illustrating one of the constituent elements of the object of the invention.

FIGS. 4 to 6 perspective views diagrammatically showing different embodiments of the object of the invention.

DETAILED DESCRIPTION OF THE PREFERRED EMBODIMENTS

Figure 4:
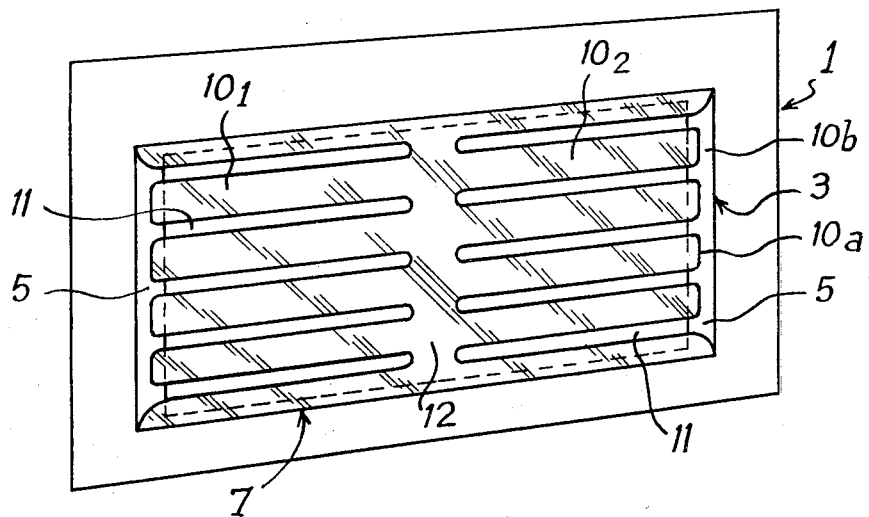

According to FIGS, 1 and 2, the presentation and display panel means for miscellaneous information comprises the actual panel 1 having any desired shape, for example rectangular as illustrated in the drawings and which can have openings 2 for its suspension on a random support by any appropriate means. Although not shown, it is obvious that different support means can be envisaged and in particular panel 1 may be provided, for example, with sleeves or flanges for the fitting of a mounting support on the ground.

Panel 1 may be made from any appropriate material and is shaped so as to have, beginning at its front face, an impression 3 for example indented with respect to the surface and whose base is also retracted in the same direction so as to define a peripheral region 5. All the front face, the region 5 and the base 4 has a covering of the same general appearance and designated by the overall reference numeral 6 and illustrated in FIG. 1 with a grey tint. Covering 6 can be of any appropriate type and preferably has the appearance of a uniform matt or bright color shade or tint provided so as to be connected or optionally incorporated into the material mass constituting panel 1, more particularly when the latter is made from a thermally shaped plastics material.

Panel 1 is associated with a matrix 7 in the precise form of the impression 3 in which it can be mounted so as to rest on the raised edge 5. Matrix 7 is maintained in impression 3 by any appropriate means, preferably selected so as to permit an optional retraction and the replacement by a matrix having different characteristics. For example, matrix 7 can be held in place by not shown adhesive means or by introducing deformable studs 8 carried by the matrix and which pass through complimentary holes made in the peripheral raised edge 5. Although not shown, the reverse arrangement would also be possible.

The fitting of matrix 7 into impression 3 thus makes it possible to define between the rear face of the matrix and the base 4 a recess 9, whose special function can be gathered from the subsequent description.

Matrix 7, which is made from a transparent material, is shaped so as to define flexible segments 10 which in the present embodiment of FIG. 1 are realized in the form of horizontally disposed parallel strips or bands separated by slots 11. The flexible strips or bands are also preferably initially provided in such a way that their free transverse edge 10a is retracted with respect to the corresponding edge of the important impression 3, so as to define with the latter a gap 10b whose function will be shown hereinafter. In the present embodiment, the edges 10a of the different strips or bands 10 are aligned and positioned on the same side of matrix 7, i.e. the different strips have, with respect to the latter, an attachment support 12 located on the same side of panel 1. Obviously, a different arrangement is also possible and in particular the extreme free transverse edges 10a could be alternately staggered or positioned in some other way with respect to one another.

Each flexible segment 10 carries information 13 of any type, i.e. symbols representing combined or independent visual information and which is carried in the form of locally relativey separated characters. Each item of information 13 is carried in any appropriate way to offer the same appearance as covering 6 of the front face of panel 1. In other words, each item of information 13 has the same appearance as the front face of panel 1, both as regards color, texture, brightness, etc in such a way that when matrix 7 occupies impression 3, the information 13 coincides with the covering 6 so that when viewed from a moderate distance such information cannot be visually discerned. The information 13 is preferably also carried by the flexible segments 10 in such a way that it is not revealed by reflections or incident rays striking the matrix 7. Thus, preferably information 13 is carried on the rear face of segments 10 and, if appropriate, the outer face thereof is given a matt surface state.

The panel according to the invention also comprises movable identification elements respectively constituted, in the manner shown in FIG. 3, by a flap 14 whose height H is approximately equal to the height of a flexible segment 10 plus the width of a slot 11. Flap 14 has a length L which is approximately equal or slightly in excess of the maximum local area which can be occupied by an item of information 13. Flap 14 is associated with a pin 15, for example a cylindrical pin, constituting a gripping and guidance member, whose cross section is compatable with a practical and easy introduction into a slot 11. The surface of flap 14 corresponding to pin 15 is provided with a covering 16, whose appearance fundamentally differs from that of covering 6 and information 13. Covering 16 is also chosen in such a way that a certain contrast is obtained with covering 6 and information 13.

Thus, for use purposes, each identification element 14 is manually seized by pin 15 in such a way as to permit the engagement of the flap in gap 10b in order to bring about by bending the raising of the corresponding strip 10 so as to permit the engagement of the flap in recess 9 and at the same time the introduction of pin 15 into the corresponding slot 11. Thus, identification element 14 can be moved freely in recess 9 and can be positioned, behind the corresponding flexible strip 10, facing the sought information 13 and which is to be made visible compard with the mass or collection carried by the matrix. The covering 16 of the flap of identification element 14 makes it possible to select an item of information by constituting a color mask contrasted for the corresponding part of covering 6 and permitting the distinct visualization of the sought information, which thus clearly stands out from the uniform coloring of matrix 7 and panel 1.

By means of the necessary number of identification elements 14, it therefore becomes possible to visualize the sought information and to easily make the selected information disappear by moving or withdrawing the identification elements 14. These operations can be performed rapidly and reliably in view of the fact that the displacement of each identification element 14 can be obtained with a high degree of precision via pin 15 traversing the corresponding slot 11 so as to be permanently accessible from the front face of the display panel.

FIG. 1 shows that the upper edge of each flexible segment 10 can optionally be associated for each selectable piece of information 13 with a raised portion 17 such as for example a notch able to receive the pin 15, thus constituting a relative immobilisation member able to oppose any untimely sliding of each identification element after seeking and selecting a piece of information which is to be visualized. Although not shown, it is obvious that any equivalent means able to assume the same function can be used.

In order to optionally improve the immobilisation of each identification element, the flexible segments 10 can be especially shaped in such a way that each acts in the manner of an elastic member pressing the flap 14 against base 4 so as to cause friction which, either alone or in association with the immobilisation action of raised portion 17, is able to contribute to maintaining each identification element 14 in the selected position.

The panel according to the invention is shown in a simplified embodiment, but it should be noted that more complex configurations are possible as a function of the number of informations carried by matrix 7, the particular application envisaged and the existance of selection criteria common to several selected informations and determining different groups which may also be subject to a preselection process.

FIG. 4 illustrates such an embodiment according to which matrix 7 has two rows of articulated segments $10_1$ and $10_2$, which are parallel to one another for each row and opposite in pairwise manner for two distinct rows, extending on either side of a common support 12. In such a case, the opposite transverse edges of segments $10_1$ and $10_2$ each define with the corresponding edges of impression 3, the gaps 10 necessary for the engagement of identification elements 14.

Figure 5:
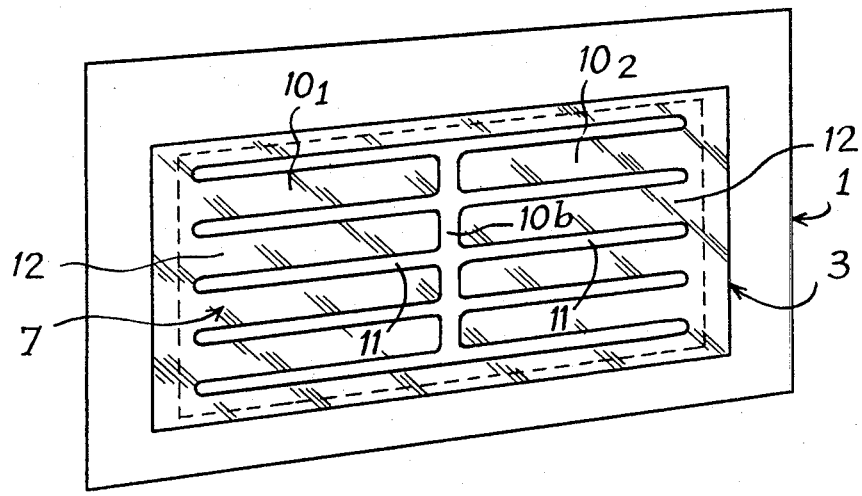

FIG. 5 shows a variant according to which the arrangement of segments $10_1$ and $10_2$ is reversed in such a way that the transverse edges face on another and together define gaps 10b.

FIG. 6 shows a variant according to which it is possible to give the articulated segments 10 different relative widths according to the information having to be carried. In the same way, matrix 7 can be constructed so that it has articulated segments extending vertically with respect to the partial or complete reading direction of the information-carrying surface, whilst it is also possible to combine such a relative arrangement with a conventional horizontal arrangement when, for example, vertically directed articulated segments $10_3$ make it possible to effect a first selection, for example, of groups of informations within which there is to be a subsequent selection by displacing an indentification element 14 along a generally horizontally oriented segment 10. In addition, matrix 7 can be formed by means of independent flexible strips and not separated from a common plate and in such a case one of the terminal portions and the panel can be connected to form an attachment support.

Although not shown, it is also possible to construct panel 1 in the form of a flat plate and to shape matrix 7 so that its application and maintaining in place by any appropriate means on the front face of said plate make it possible to define the recess 9 necessary for engagement, the fitting and the sliding of the identification element or elements used.

The object of the invention is particularly suitable for forming a display or presentation panel for results of competitions, forecasts, various games, as well as for use as a didactic or calendar panel.

The invention is not limited to the embodiments described and represented hereinbefore and various modifications can be made thereto without passing beyond the scope of the invention.

What is claimed is:

1. An information display panel comprising:
   a support plate including a front surface having a visual characteristic associated therewith;
   a matrix member mounted on said support plate and including an attachment support adapted to be secured to said support plate and at least one elongated transparent flexible member, each said flexible member being secured at one end thereof to said attachement support in facing relation to said front surface and each flexible member having a transverse free edge and further having information markings thereon with a visual characteristic substantially identical to the visual characteristic of said front surface whereby said markings are not visually discernible relative to said front surface, said at least one flexible member having at least one slot associated therewith; and
   at least one identification element adapted for slidable movement relative to said at least one flexible member in a direction parallel to said at least one slot, said at least one identification element having a visual characteristic different from said visual characteristic of said information markings, whereby said information markings are visually discernible when said at least one identification element is disposed in facing relation thereto, 2. A panel according to claim 1, wherein said matrix member includes at least another flexible member which is separated from said at least one flexible member by said at least one slot, and wherein each transverse free edge is adapted for movement in a direction away from the plate.

3. A panel according to claim 2, wherein each of the flexible members is spaced from said plate so as to define a recess therebetween and said at least one identification element is adapted to be disposed in said recess by moving the transverse free edge of at least one of said flexible members in a direction away from the plate, and wherein each identification element has a substantially planar body portion with said different visual characteristic and a gripping member projecting therefrom adapted to extend into said at least one slot for positioning said body portion in facing relation to at least one of said information markings.

4. A panel according to claim 3, wherein each of said flexible members includes at least one immobilization portion for engaging the gripping member of an identification element so as to prevent movement of said identification element relative to an information marking of a respective flexible member.

5. A panel according to claim 3, wherein sad body portion has a surface adapted to be positioned in facing relation to at least one information marking, said surface having an area which is at least as large as the area encompassed by said at least one information marking.

* * * * *